United States Patent [19]

Jacquet et al.

[11] Patent Number: 4,582,367
[45] Date of Patent: Apr. 15, 1986

[54] TRACK ROLLER SUSPENSION FOR CRAWLER TRACTOR

[75] Inventors: Georges C. Jacquet, St. Germain en Laye, France; Giorgio P. Grattapaglia, Turin, Italy

[73] Assignee: Fiatallis Europe, S.p.A., Le Cce, Italy

[21] Appl. No.: 563,125

[22] Filed: Dec. 19, 1983

[30] Foreign Application Priority Data

Jan. 12, 1983 [IT] Italy ............... 67021 A/83

[51] Int. Cl.⁴ .................. B62D 55/16; B62D 55/30
[52] U.S. Cl. ....................................... 305/27; 305/28; 305/31
[58] Field of Search .................. 305/25, 27, 28, 31

[56] References Cited

U.S. PATENT DOCUMENTS

| | | | |
|---|---|---|---|
| 1,011,634 | 12/1911 | Matteson | 305/31 X |
| 1,186,785 | 6/1916 | Holt | 305/28 X |
| 1,474,918 | 11/1923 | Schneider | 305/25 X |
| 1,514,187 | 11/1924 | Wickersham | 305/25 |
| 1,707,953 | 4/1929 | Winsor | 305/28 X |

FOREIGN PATENT DOCUMENTS

| | | | |
|---|---|---|---|
| 208726 | 4/1960 | Austria | 305/28 |
| 311169 | 2/1918 | Fed. Rep. of Germany | 305/25 |

*Primary Examiner*—David A. Scherbel
*Attorney, Agent, or Firm*—Emrich & Dithmar

[57] ABSTRACT

A crawler tractor in which the track rollers supporting the crawler tractor on endless tracks passing in contact therewith are carried by a support structure suspended resiliently from the track bogie. The track roller assembly is thereby vertically movable relative to the drive wheel and the track-tensioning wheel of the crawler tractor for increasing the efficiency and stability of the crawler tractor when utilizing auxiliary earth moving equipment by increasing the amount of endless track in contact with the supporting surface during operation of the auxiliary equipment. The resilient suspension system minimizes the track print when the auxiliary equipment is not being used in order to facilitate maneuvering during steer-by-driving operation.

6 Claims, 7 Drawing Figures

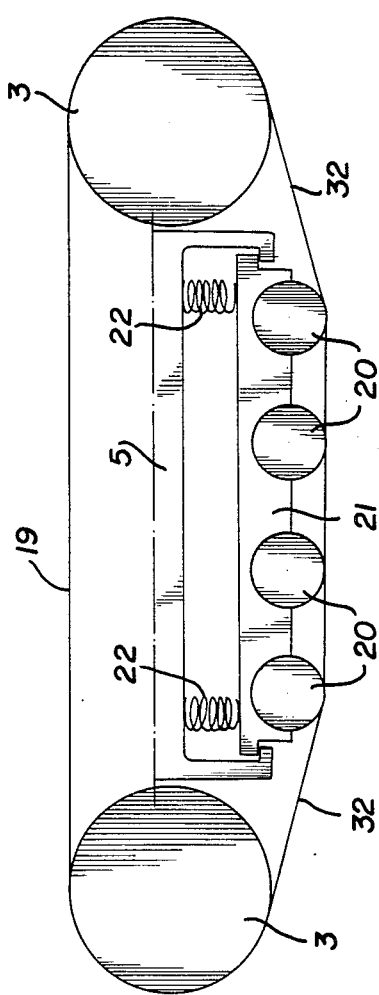
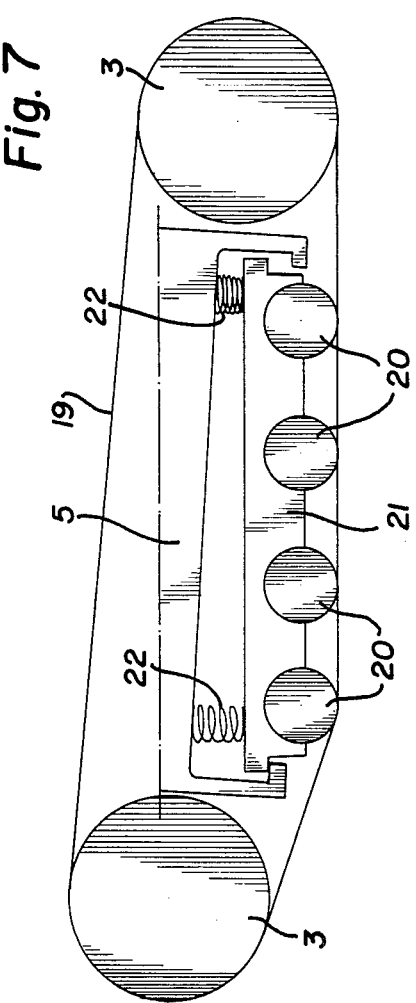

TRACK ROLLER SUSPENSION FOR CRAWLER TRACTOR

BACKGROUND OF THE INVENTION

This invention relates in general to construction machinery or earth moving equipment and, in particular, to crawler type tractors.

More specifically, but without restriction to the particular use which is shown and described, this invention relates to a track roller suspension system for use with crawler tractors wherein a pair of endless track support and propel the vehicle over a supporting surface.

Crawler type vehicles such as crawler tractors are used in many applications for earth moving and construction purposes. Such crawler tractors may be generally equipped with auxiliary equipment such as a dozer blade or loader bucket for moving or loading materials, or a ripper mechanism which is utilized to break up or loosen the ground over which the crawler tractor moves.

As is known to those skilled in the art, a problem frequently encountered when using a crawler tractor for such operations results from the forces encountered on the tractor due to operation of the auxiliary equipment. These operational forces are frequently sufficient to reduce the effective contact area between the crawler track and the ground, sometimes referred to as the "track print." The reduction in size of the track print reduces the tractive force between the track and the ground thereby resulting in a less efficient use of the machine's power.

In prior art crawler tractors, the vehicle is supported on the endless tracks by a series of track rollers rotatably secured on a support structure which is fixed to a track roller supporting bogie secured to the tractor chassis. When the tractor is not operating the auxiliary equipment, a predetermined portion of the endless track is in ground contact supporting the vehicle for movement and defining a normal track print. However, when the auxiliary equipment is being utilized, for example either a front loading bucket or a rear mounted ripper mechanism, the operational capability of such equipment can greatly reduce the efficiency of the vehicle operation. Such loss of efficiency occurs because the forces applied through the auxiliary equipment cause the ground-engaging portion of the track, or track print, to be reduced.

For example, when a front end loader is utilized, the loading forces applied in attempting to load material into the bucket or raise the loaded bucket creates a downwardly directed force at the front end of the crawler tractor which will tend to raise the rear end of the crawler tractor reducing the track print or amount of track in contact with the ground. As a result, the driving force which may be applied through the track of the crawler during the loading operation is reduced, decreasing machine efficiency. Similarly, when a ripper apparatus is utilized on the crawler tractor, the force applied by the ripper unit at the rear of the tractor imposes an upwardly directed moment on the front end of the crawler which reduces the track print thereby decreasing the amount of driving force the crawler may apply during the ripping operation.

In the present invention, the vehicle supporting track rollers are rotatably secured on a resiliently suspended support structure. The resilient support of the structure permits the crawler tractor to operate with a minimum track print when auxiliary equipment is not being utilized, thereby increasing maneuverability during steer-by-driving operations. However, when auxiliary equipment, such as dozer blades, loading buckets, rippers or scarifiers, are being used the forces applied to the crawler during such operations act on the resilient suspension system to increase the track print in order to provide additional tractive force during such operations. The track print area is increased for that portion of the track nearest the auxiliary equipment thereby making additional tractive force available and increasing the stability of the machine during these operations.

SUMMARY OF THE INVENTION

It is, therefore, an object of this invention to improve crawler tractors.

Another object of this invention is to improve crawler tractors by increasing track print upon the application of loading forces on the crawler tractors during operation of auxiliary equipment in order to increase tractive forces.

A further object of this invention is to increase the contact area between the crawler track and the supporting surface in an area of the track to maximize the stability of the machine upon utilization of auxiliary equipment.

Still another object of this invention is to minimize track print when auxiliary equipment is not being used to facilitate crawler maneuverability.

These and other objects are attained in accordance with the present invention wherein there is provided a crawler tractor in which the track rollers supporting the crawler tractor on endless tracks passing in contact therewith are carried by a support structure suspended resiliently from the track bogie. The track roller assembly is thereby vertically movable relative to the drive wheel and the track-tensioning wheel of the crawler tractor for increasing the efficiency and stability of the crawler tractor when utilizing auxiliary earth moving equipment by increasing the amount of endless track in contact with the supporting surface during operation of the auxiliary equipment. The resilient suspension system minimizes the track print when the auxiliary equipment is not being used in order to facilitate maneuvering during steer-by-driving operation.

DESCRIPTION OF THE DRAWINGS

Further objects of the invention, together with additional features contributing thereto and advantages accruing therefrom, will be apparent from the following description of a preferred embodiment of the invention which is shown in the accompanying drawings, with like reference numerals indicating corresponding parts throughout, wherein:

FIGS. 6 and 7 are mechanical schematics to better illustrate the operation of the track in accordance with the invention.

DESCRIPTION OF A PREFERRED EMBODIMENT

Figure 1:
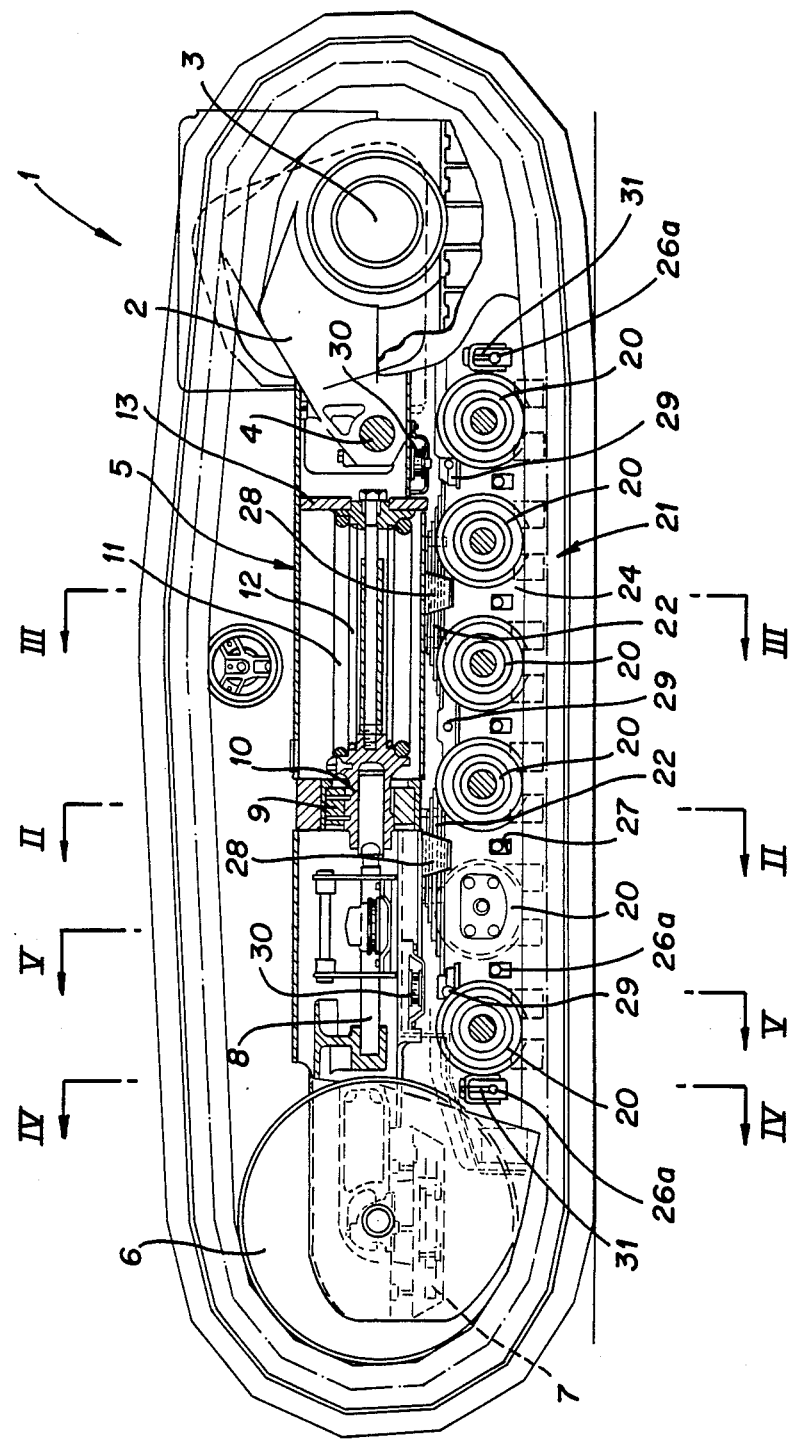
FIG. 1 is a partially sectioned side view of an endless track portion of a crawler tractor or earth moving equipment constructed in accordance with the invention.

Referring now to FIG. 1, there is shown one of the two endless tracks, generally indicated by reference numeral 1, of an earth moving machine or crawler tractor which includes a transmission housing 2, operatively connected to two drive wheels or sprockets 3, only one of which would be shown in the drawing. A bogie 5 is pivotally supported from the transmission housing 2 about a transverse axis 4, and supports therefrom a track-tensioning wheel or sprocket 6 which is slidable longitudinally to the drive sprocket 3 in a manner well known to those skilled in the art. The track-tensioning sprocket 6 is supported in a forked element for sliding movement on longitudinally extending guides 7 of the bogie 5 to maintain a desired track tension. The forked element is fixed at one end to a bar 8, the opposite end of which is housed in a cap element 10 which is slidably mounted on a guide bushing 9 forming part of the bogie 5. In this manner the relative axial position between the cap element 10 and the respective end of the bar 8 is adjustable for such relative positioning. A pair of coaxial, helical springs 11, 12 are carried about a suitable support between the cap element 10 and a transverse wall 13 of the bogie 5 to maintain the track-tensioning sprocket 6 in a tensioning position.

Figure 5:
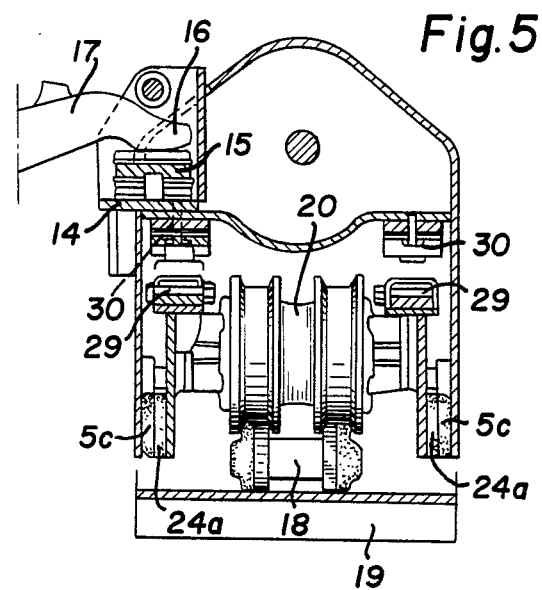

As best illustrated in FIG. 5, a horizontal wall 14, forming part of the bogie 5, carries a rubber shock absorber 15 which has an upper bearing plate positioned to be engaged by one end 16 of a cross member 17 which is supported on the tractor chassis, and is pivotable about the longitudinal axis thereof. The opposite end of the pivotal cross member 17 (not illustrated) similarly engages a corresponding part of the other endless track of the crawler and these components provide a sutiable suitable movement stop.

Figure 2:
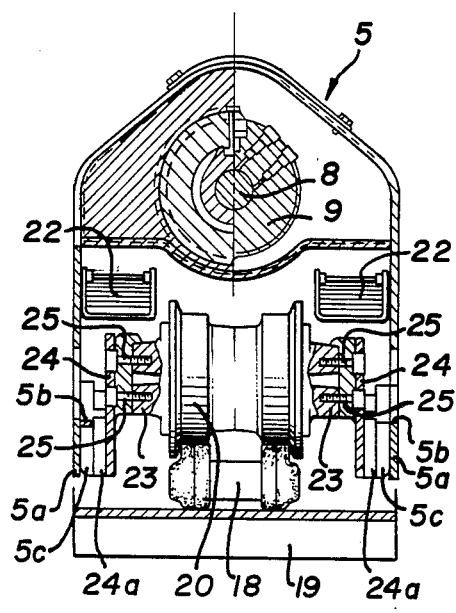
FIGS. 2-5 are cross-sectional views taken along lines II, III, IV, and V of FIG. 1 with portions removed to better illustrate the components of the invention.
Figure 3:
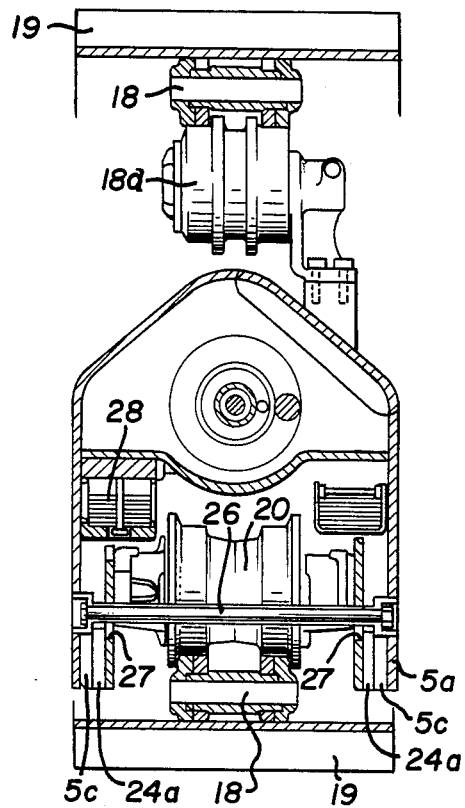

The endless track or chain 18, which passes about the drive sprocket 3 and the track-tensioning sprocket 6, carries a series of track shoes or treads 19, shown in partial cross section in FIGS. 2-5. In FIGS. 1 and 3, there is illustrated a track carrier roller 18a, which does not support the vehicle but supports the upper run of the endless track chain 18 as it passes between the drive sprocket 3 and the track-tensioning or idler sprocket 6. The track rollers 20, positioned in engagement with the bottom run of the endless track 18 are used to support the vehicle and are each carried by a single support structure 21 which is resiliently suspended from the bogie 5.

A suspension system 22 is interposed between the bogie 5 and the support structure 21 and comprises four leaf springs with several superimposed leaves. Each of the track rollers 20 is mounted for free rotation on a support shaft, the ends of which are fixed with a taper fit to two supports 23 as illustrated in FIG. 2. The support structure 21 for the track rollers 20 includes two longitudinally extending vertical walls 24, to which the supports 23 for each track roller 20 are fixed by externally-accessible screws 25. In this manner each track roller 20 can be readily removed and replaced from the support structure 21 as necessary.

The bogie 5 includes two vertical longitudinal side panels 5a located one on each side of the series of track rollers 20. Each bogie side panel 5a has apertures 5b to permit access to the screws 25 used for removably securing the track rollers 20 to the supports 23. The lower part of the two bogie side panels 5a are coupled together by transversing extending tie-rods 26, best illustrated in FIG. 3. The ends of the tie-rods are guided in vertical slots 27 formed in the vertical walls 24 in which the track rollers 20 are supported. Each of the suspension system forming leaf springs 22 are fixed at the center thereof to the bogie 5 as best shown in FIGS. 1 and 3 by reference numeral 28. The end of the leaf springs 22 are connected to a corresponding vertical support wall 24 as best illustrated in FIG. 1 and 5 at reference numeral 29.

Figure 4:
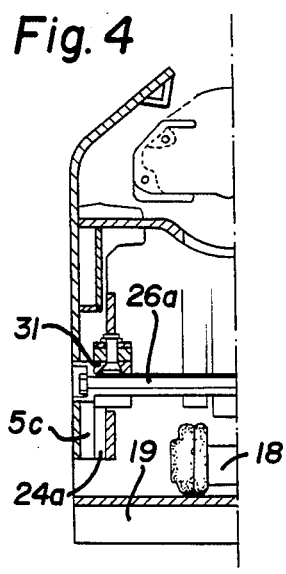

In operation the limit of downward movement of the bogie structure 5 relative to the support structure 21 in which the track rollers 20 are supported, is defined by the engagement of shock absorbing rubber buffers 30 against the corresponding ends of the leaf springs 22 as best shown in FIGS. 1 and 5. The upward movement limit of the bogie structure 5 relative to the track roller support structure 21, however, is defined by the engagement of two transversely extending tie-rods 26a with corresponding rubber shock absorbing buffers 31 carried by the track roller support structure 21 as best shown in FIGS. 1 and 4.

Referring again to FIGS. 2 to 5, the lower portions of the two bogie side panels 5a have guide slots 5c on their inner surfaces which are engaged by corresponding guide slides 24a carried on the outer surface of the vertical support walls 24. In this manner, as schematically illustrated in FIG. 6, the crawler tractor track is illustrated in a condition when the auxiliary equipment is not being used. In this condition the track print area is defined by that portion of the lower run of the endless track 19 in contact with the supporting surface between the two track formed ramps 32.

When the auxiliary equipment is in use, for purposes of illustration a ripper apparatus, because of the forces incurred upon the ripper apparatus contacting the ground being broken up or loosened, a force is applied to the rear of the crawler tractor resulting in the track condition illustrated schematically in FIG. 7. As seen, the bogie 5 is pivoted downwardly compressing the leaf spring suspension system 22 at one end of the support structure 21 adjacent to the rear or drive sprocket 3. The lower track portion, ramp 32, which previously existed between the rear or drive sprocket 3 and the rearmost track roller 20, is thereby positioned in contact with the ground to increase the track print area such that it extends from the foremost track roller 20 to the midpoint of the drive sprocket 3. While the spring suspension system 22 permits the drive sprocket 3 to lower, increasing the track print, the front portion of the crawler tractor does not raise a corresponding amount. Therefore, the endless track may work with an increased number of treads in contact with the ground, increased track print, allowing the maximum gripping forces to be achieved and increasing the efficiency of operation of the crawler tractor. Since the increased track print occurs on that portion of the lower half of the track adjacent to the auxiliary equipment in operation, increased stability for the machine is provided as well as an increased driving force improving overall machine efficiency.

When the auxiliary equipment is no longer in operation, the spring suspension system 22 will return to its unstressed position, such as shown schematically in FIG. 6, minimizing the track print of the lower portion of the endless track providing the additional advantage of increased maneuverability for the machine in its steer-by-driving operation. Such a suspension system, in addition, improves the comfort of the driver during movement of the crawler tractor since it provides a certain degree of yieldability in the chassis suspension which enables shocks due to the roughness of the ground to be damped.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiment illustrated in the drawings and described in the specification as the best mode presently contemplated for carrying out this invention, but that the invention will include any embodiments falling within the scope of the appended claims.

What is claimed is:

1. A track roller suspension system for use in a crawler tractor having a pair of endless tracks supported for movement in an endless path about a drive sprocket operatively connected to a source of rotational power and a track-tensioning idler sprocket carried at the free end of a track roller supporting bogie, including
   a track roller supporting bogie for carrying a plurality of track rollers in a position to contact the endless track for supporting the crawler tractor upon a support surface,
   a track roller support structure resiliently suspended from said bogie by a plurality of leaf springs for vertical movement relative thereto to vary the amount of track in contact with the support surface in response to the relative vertical movement between said bogie and said track roller support structure,
   said track roller support structure comprising a pair of longitudinally extending vertical walls, each of said pair of vertical walls comprising two separate spaced-apart plates, each one of said plates being supported from one end of one of said plurality of leaf springs, and
   a plurality of track rollers rotatably supported from said track roller support structure and positioned in contact with the endless crawler track for moving the crawler tractor upon the support surface.

2. The track roller suspension system set forth in claim 1 wherein each track roller of said plurality includes a horizontally extending support shaft fixedly secured between said longitudinally extending vertical walls with the track roller mounted for rotational movement upon said shaft.

3. A track roller suspension system as defined in claim 2 wherein each of said track roller support shafts are removable from said longitudinally extending vertical walls by externally-accessible screws.

4. A track roller suspension system as defined in claim 3 wherein each bogie includes two longitudinally extending vertical side panels between which said track rollers are positioned, and wherein each side panel has apertures formed therein for allowing access to said screws for fixedly securing said track roller support shafts to said longitudinally extending vertical walls of said track roller support structure.

5. The track roller suspension system of claim 4 further including transverse tie-rods interconnecting the lower part of said bogie side panels and vertical guide slots formed therein to facilitate vertical movement between said track roller support structure and said track roller supporting bogie.

6. The track roller suspension system defined in claim 1 further including shock-absorber means for defining the limits of vertical movement between said track roller support structure and said track roller supporting bogie.

* * * * *